United States Patent
Dominguez Pumar et al.

(10) Patent No.: US 10,684,242 B2
(45) Date of Patent: Jun. 16, 2020

(54) CONTROL METHOD FOR GAS CHEMOSENSORS AND GAS DETECTION SYSTEM

(71) Applicant: UNIVERSITAT POLITECNICA DE CATALUNYA, Barcelona (ES)

(72) Inventors: Manuel Dominguez Pumar, Barcelona (ES); Lukasz Kowalsky, Barcelona (ES)

(*) Notice: Subject to any disclaimer, the term of this patent is extended or adjusted under 35 U.S.C. 154(b) by 143 days.

(21) Appl. No.: 15/764,196

(22) PCT Filed: Oct. 3, 2016

(86) PCT No.: PCT/ES2016/070693
§ 371 (c)(1),
(2) Date: Mar. 28, 2018

(87) PCT Pub. No.: WO2017/055671
PCT Pub. Date: Apr. 6, 2017

(65) Prior Publication Data
US 2018/0306739 A1  Oct. 25, 2018

(30) Foreign Application Priority Data
Oct. 2, 2015 (ES) .................................. 201531421

(51) Int. Cl.
  *G01N 27/12* (2006.01)
  *H05B 1/02* (2006.01)

(52) U.S. Cl.
  CPC ......... *G01N 27/123* (2013.01); *G01N 27/124* (2013.01); *H05B 1/0227* (2013.01); *H05B 1/0288* (2013.01)

(58) Field of Classification Search
  CPC .................................................. G01N 27/123
  See application file for complete search history.

(56) References Cited

U.S. PATENT DOCUMENTS 4,485,667 A * 12/1984 Lalauze ............... G01N 27/123
                                                        338/34
5,451,371 A *  9/1995 Zanini-Fisher ........ G01N 27/16
                                                        204/424

(Continued)

FOREIGN PATENT DOCUMENTS

WO   WO2005015190   2/2005

OTHER PUBLICATIONS

Junhua Ding, Thomas J. McAvoy, Richard E. Cavicchi, Steve Semancik, "Surface state trapping models for SnO2-based microhotplate sensors", Sensors and Actuators B: Chemical, vol. 77, Ed. 3, pp. 597-613, 2001.

(Continued)

*Primary Examiner* — Paul M. West
*Assistant Examiner* — Mark A Shabman
(74) *Attorney, Agent, or Firm* — Eugenio J. Torres-Oyola; Victor M. Rodriguez-Reyes; Rafael Rodriguez-Muriel (57) ABSTRACT

A control method for gas chemosensors having a sensitive layer, which comprises the steps of: a) measuring the resistivity of the sensitive layer at a particular moment, the sensitive layer being at a particular temperature; b) establishing a temperature profile to be applied to the sensitive layer, based on the resistivity value measured; c) obtaining the average temperature value across the temperature profiles applied to the sensitive layer during a time interval and comparing the average temperature with stored values to determine changes in the gas concentration. The invention also relates to a gas detection system comprising a gas chemosensor connected to control means connected to heating means associated with the sensitive layer, defining a control loop with sigma-delta topology.

16 Claims, 7 Drawing Sheets

(56) References Cited

U.S. PATENT DOCUMENTS

| | | | | |
|---|---|---|---|---|
| 6,688,159 | B1* | 2/2004 | Grunewald | G01N 27/18 |
| | | | | 702/24 |
| 2002/0092341 | A1* | 7/2002 | Cardinale | G01N 27/12 |
| | | | | 73/25.01 |
| 2008/0280058 | A1* | 11/2008 | Krunks | H01L 21/0237 |
| | | | | 427/453 |
| 2010/0139369 | A1* | 6/2010 | Chen | H05B 1/0288 |
| | | | | 73/25.05 |
| 2010/0196746 | A1* | 8/2010 | Koyanaka | B01J 23/34 |
| | | | | 429/50 |
| 2013/0125617 | A1* | 5/2013 | Gouma | G01N 27/122 |
| | | | | 73/23.3 |

OTHER PUBLICATIONS

J. Fonollosa, S. Sheik, R. Huerta, y S. Marco, "Reservoir computing compensates slow response of chemosensor arrays exposed to fast varying gas concentrations in continuous monitoring," Sensors Actuators B Chem., vol. 215, pp. 618-629, Ago. 2015.

J. Samitier, J. M. López-Villegas, S. Marco, L. Cámara, A. Pardo, O. Ruiz, y J. R. Morante, "A new method to analyse signal transients in chemical sensors," Sensors Actuators B Chem., vol. 18, No. 1-3, pp. 308-312, Mar. 1994.

C. Di Natale, S. Marco, F. Davide, y A. D'Amico, "Sensor-array calibration time reduction by dynamic modelling," Sensors Actuators B Chem., vol. 25, No. 1-3, pp. 578-583, Abr. 1995.

E. Llobet, J. Brezmes, X. Vilanova, J. E. Sueiras, y X. Correig, "Qualitative and quantitative analysis of volatile organic compounds using transient and steady-state responses of a thick-film tin oxide gas sensor array," Sensors Actuators B Chem., vol. 41, No. 1-3, pp. 13-21, Jun. 1997.

R. Gutierrez-Osuna, "Pattern analysis for machine olfaction: a review," IEEE Sens. J., vol. 2, No. 3, pp. 189-202, Jun. 2002.

K. Muezzinoglu, A. Vergara, R. Huerta, N. Rulkov, M. I. Rabinovich, A. Selverston, y H. D. I. Abarbanel, "Acceleration of chemosensory information processing using transient features," Sensors Actuators B Chem., vol. 137, No. 2, pp. 507-512, Abr. 2009.

J. G. Monroy, J. González-Jiménez, y J. L. Blanco, "Overcoming the slow recovery of MOX gas sensors through a system modeling approach.," Sensors (Basel)., vol. 12, No. 10, pp. 13664-80, Ene. 2012.

R. Gutierrez-Osuna, H. T. Nagle, y S. S. Schiffman, "Transient response analysis of an electronic nose using multi-exponential models," Sensors Actuators B Chem., vol. 61, No. 1-3, pp. 170-182, Dic. 1999.

R. Ionescu, E. Llobet, S. Al-Khalifa, J. W. Gardner, X. Vilanova, J. Brezmes, y X. Correig, "Response model for thermally modulated tin oxide-based microhotplate gas sensors," Sensors Actuators B Chem., vol. 95, No. 1-3, pp. 203-211, Oct. 2003.

S. Marco, A. Pardo, F. A. M. Davide, C. Di Natale, A. D'Amico, A. Hierlemann, J. Mitrovics, M. Schweizer, U. Weimar, y W. Göpel, "Different strategies for the identification of gas sensing systems," Sensors Actuators B Chem., vol. 34, No. 1-3, pp. 213-223, Ago. 1996.

A. Pardo, S. Marco, y J. Samitier, "Nonlinear inverse dynamic models of gas sensing systems based on chemical sensor arrays for quantitative measurements," Instrum. Meas. IEEE Trans., vol. 47, No. 3, pp. 644-651, 1998.

S. De Vito, E. Massera, M. Piga, L. Martinotto, y G. Di Francia, "On field calibration of an electronic nose for benzene estimation in an urban pollution monitoring scenario," Sensors Actuators, B Chem., vol. 129, No. 2, pp. 750-757, 2008.

S. De Vito, A. Castaldo, F. Loffredo, E. Massera, T. Polichetti, I. Nasti, P. Vacca, L. Quercia, y G. Di Francia, "Gas concentration estimation in ternary mixtures with room temperature operating sensor array using tapped delay architectures," Sensors Actuators, B Chem., vol. 124, No. 2, pp. 309-316, 2007.

E. Di Lello, M. Trincavelli, H. Bruyninckx, y T. De Laet, "Augmented switching linear dynamical system model for gas concentration estimation with MOX sensors in an open sampling system.," Sensors (Basel)., vol. 14, No. 7, pp. 12533-59, Ene. 2014.

Horrillo Güemes, M del C., Study and implementation of sensors for CO based on the modulation of the electrical conductivity of the Semiconductor SnO2. Doctoral Thesis, Complutense University of Madrid. [online] 1992 [retrieved Feb. 9, 2017]. Recovered from <http./biblioteca.ucm.es/tesis/19911996/X/0/X0008401.pdf>pp. 12 and 13.

\* cited by examiner

CONTROL METHOD FOR GAS CHEMOSENSORS AND GAS DETECTION SYSTEM

CROSS-REFERENCE TO RELATED APPLICATIONS

This application is the entry into national phase of International Application No. PCT/ES2016/070693, filed on Oct. 3, 2016, the content of which is hereby incorporated by reference in its entirety, which claims the benefit of Spanish Patent Application No. P201531421, filed on Oct. 2, 2015, the entire disclosure of which is incorporated herein by reference.

OBJECT OF THE INVENTION

The object of the present application is the disclosure of a control method for gas chemosensors and of a gas detection system. More particularly, the invention provides the development of a method and of a system pertaining to the technical sector of gas resistive chemosensors that allow speeding up the response of gas resistive chemosensors relative to the systems and methods of the state of the art.

BACKGROUND OF THE INVENTION

Gas chemosensors based on metal oxides are made of a sensitive layer whose resistivity is measured. To carry out measurements, setting the temperature of said layer in a determined range that usually depends on the particular characteristics of the layer (normally in the 150° C.-500° C. range) is needed. To that end, the sensor normally includes a heating element located close to the sensitive layer that is used to set the temperature thereof during the sensor operation.

The common use mode of these sensors consists in setting a determined temperature on the sensor (with the heating resistor) and continuously monitoring the value of the chemical resistivity. The dynamics of the sensor system is then determined by the kinetics of the chemical reactions themselves that take place in the sensitive layer based on the gases present. This kinetics is extremely slow (10-20 minutes), [1]. The concentrations of absorbed species in the layer based on the gases that the sensor contacts generate variations on the value of chemical resistivity. These are the variations whose measurement is intended.

It is important to highlight that the measurement is carried out at a constant temperature, since the resistivity of the sensitive layer also varies based on its own temperature. The sensitive layer is made of metal oxides and, therefore, these are semiconductive. This causes the dependence of the chemical resistivity on temperature to be very high, and for it to have, in addition, very fast kinetics.

In the state of the art, numerous semiconductive metal oxides are known, such as, without limitation, NiO, CuO, $Cr_2O_3$, $Co_3O_4$, $Mn_3O_4$, ZnO, $SnO_2$, $TiO_2$, $WO_3$, $In_2O_3$, or $Fe_2O_3$. In the state of the art, it is known that there exist two types of semiconductive metal oxides, known as type n semiconductors and type p semiconductors, that show differences regarding their conductivity, which, in turn, influences the electrical properties of the sensor that comprises a sensitive layer formed by some of these oxides.

If the sensitive layer is formed by a type n metal oxide such as, without limitation, ZnO, $SnO_2$, $TiO_2$, $WO_3$, $In_2O_3$ or $Fe_2O_3$, in the presence of air, and therefore of oxygen, oxygen molecules are absorbed into the surface that become ionized, giving rise to different oxygen species (e.g. $O_2$, $O^-$, or $O^{2-}$). This attracts the electrons close to the surface of the sensitive layer, giving rise to the formation of a core-shell configuration in which the core shows properties typical of a semiconductor, whereas the shell shows a resistive electrical dual layer.

In contrast, if the sensitive layer is formed by a type p metal oxide such as, without limitation, NiO, CuO, $Cr_2O_3$, $Co_3O_4$, or $Mn_3O_4$, in the presence of air, and therefore of oxygen, a core-shell configuration is formed in which the shell shows semiconductive properties through an accumulation of voids, whereas que the core behaves similarly to an insulation.

Chemical resistivity depends on:

A) The instant temperature. The dependence is very high and shows very fast dynamics (temperature changes that generate changes in the resistivity in periods smaller than 1 ms). It does not provide any type of information relating to the gases whose measurement is intended, the latter possibly being an interfering signal.

B) The concentrations of absorbed species within the layer based on the gases to which they have been exposed (related with chemosorption and physisorption phenomena). This dependence has very slow kinetics. However, it is the one that provides information about changes in the concentrations of the gases that the sensor is in contact with.

Since the sensor is normally used at a constant temperature, the first dependence does not represent a problem, completely dominating the second mechanism, which is the desired one.

The problem, however, is that the response times if the sensor is used this way are relatively very high, and the recovery time, in particular, is often extremely long.

On the other hand, other more advanced methods exist for the measurement of gases taking advantage of their own transient response. The response of chemical transducers to external stimuli is produced both in permanent regime and in the shape of a transient response [2-5]. To infer the temporary evolution of the concentrations of gases to be measured, a measurement protocol is usually followed in which the sensors are exposed to reference air and to a gas sample of which information is desired. Based on the study of the transient among signals, a calibration model is obtained that allows improving the response time of the sensors [6-7]. One of the disadvantages of this approach is the complexity in the treatment of the samples, as well as the need for some control over the exposure to gases. Extensive work has been done to obtain dynamic models of sensors [8-11], recognizing the need to work with non-linear models in general. This lack of linearity is a problem when it comes to generating prediction algorithms of the temporal evolution of the gas concentrations. In this regard, some studies have been oriented to improving the response time of the chemo-resistive transducers based on a post-processing of the raw data provided by the transducers. In this context, studies that employ neural networks [12-13] or "support vector machines" deserve particular mention [14]. Another approach has consisted in treating the system as a linear system changing in time, consisting in switching between linear models, depending on whether it is estimated that the sensor is in a ramp-up or recovery phase [15], using Kalman filtering to obtain an estimate of the concentration to be measured.

In any case, all of these approaches assume a very high computational load, they are sensitive to noise and they have not been able to obtain a substantial improvement in the response time of the system.

DESCRIPTION OF THE INVENTION

The present invention has been developed with the purpose of providing a control method for gas chemosensors and a gas detection system that overcome the previously mentioned disadvantages, providing, in addition, further advantages that will be evident from the following attached description.

The gases to be detected with the present invention can be any that are compatible with a sensitive layer of the chemosensor.

Therefore, an object of the present application is a control method for gas chemosensors, the chemosensors being of the type that shows at least one sensitive layer, which comprises the steps of:
a) measuring the resistivity of the sensitive layer at a particular moment of a time interval, the sensitive layer being at a predetermined reference temperature;
b) based on the resistivity value measured in step a), establishing a temperature profile to be applied to the sensitive layer during a time interval subsequent to that of step a);
c) obtaining the average of the temperature values across the temperature profiles applied to the sensitive layer during at least one time interval subsequent to that of step a), and comparing said average with stored values to determine changes in the concentration of some gas that is to be detected.

Thanks to these characteristics a control method for gas chemosensors is achieved that reduces their response time to variations in the gas concentrations, compared with the state of the art methods.

The average temperature applied to the sensitive layer is modulated to keep the surface potential of the nanostructures of the sensitive layer constant. With the previously mentioned steps, the resistivity of the sensitive layer is periodically monitored and temperature profiles are generated that force the condition of keeping a constant resistivity of the sensitive layer at a reference temperature. The changes induced by the presence of the target gases in the sensitive layer have to be compensated for by corresponding changes in the average temperature applied to said sensitive layer.

The feedback signal generated by the method, corresponding to the temperature profile applied to the sensitive layer, constitutes the system output.

In the present invention, it must be understood that the temperature profiles may adopt any form available to a person skilled in the art, in which an average of the temperatures applied to the sensitive layer is established over a predetermined time interval.

According to an additional aspect of the present invention, the temperature profile established in step b) is chosen amongst at least one pair of pre-established temperature profiles, whose average temperatures are different from each other.

The sensitive layer of the sensor is made of a semiconductive metal oxide selected from type n semiconductors and type p semiconductors, defined hereinabove. Preferably, the type n semiconductive oxides of the invention are selected from the group consisting of ZnO, $SnO_2$, $TiO_2$, $WO_3$, $In_2O_3$, and $Fe_2O_3$. More preferably, the semiconductive oxide of the invention is $WO_3$. On the other hand, the type p semiconductive oxides of the invention are selected from the group consisting of NiO, CuO, $Cr_2O_3$, $Co_3O_4$, and $Mn_3O_4$. The method of the present invention is applicable to sensors made of a sensitive layer made of a semiconductive metal oxide, and, as a result, it is applicable both to sensors made of a sensitive layer made of a type n semiconductive metal oxide, and to a sensitive layer made of a type p semiconductive metal oxide. In addition, since it is widely known in the state of the art that type n semiconductive metal oxides and those of type p show distinct electrical properties, the expert in the field will understand that the control laws used by the present method applicable to the type n semiconductive metal oxides are opposite to the ones used for type p semiconductive metal oxides, as described hereinafter.

In an embodiment, for those sensors that are made of a sensitive layer in turn made of a type n metal oxide selected amongst ZnO, $SnO_2$, $TiO_2$, $WO_3$, $In_2O_3$, and $Fe_2O_3$, preferably $WO_3$, four different situations may occur by applying the method of the invention, based on the type of atmosphere present, i.e. oxidizing or reducing, and on whether the resistivity value measured in step a) is greater or lower than a threshold resistivity value.

In an oxidizing atmosphere environment, if the resistivity value measured in step a) is lower than a threshold resistivity value, a temperature profile is applied to the sensitive layer whose average temperature is greater than the average temperature of the other available temperature profile. And in the case of there being available more than one pair of pre-established temperature profiles, one is chosen having an average temperature greater than that of the profile applied in a previous time interval, or in the case that the latter is the maximum average temperature available, the same is applied.

In contrast, when in an oxidizing atmosphere the resistivity value measured in step a) is greater than a threshold resistivity value, a temperature profile is applied to the sensitive layer whose average temperature is lower than the average temperature of the other available temperature profile. And in the case of there being available more than one pair of pre-established temperature profiles, one is chosen having an average temperature lower than that of the profile applied in a previous time interval, or in the case that the latter is the minimum average temperature available, the same is applied.

In the case of a reducing atmosphere, if the resistivity value measured in step a) is greater than a threshold resistivity value, a temperature profile is applied to the sensitive layer whose average temperature is greater than the average temperature of the other available temperature profile. And in the case of there being available more than one pair of pre-established temperature profiles, one is chosen having an average temperature greater than that of the profile applied in a previous time interval, or in the case that the latter is the maximum average temperature available, the same is applied.

In contrast, when in a reducing atmosphere the resistivity value measured in step a) is lower than a threshold resistivity value, a temperature profile is applied to the sensitive layer whose average temperature is lower than the average temperature of the other available temperature profile. And in the case of there being available more than one pair of pre-established temperature profiles, one is chosen having an average temperature lower than that of the profile applied in a previous time interval, or in the case that the latter is the minimum average temperature available, the same is applied.

In another embodiment, for those sensors that are made of a sensitive layer made, in turn, of a type p metal oxide selected amongst NiO, CuO, $Cr_2O_3$, $Co_3O_4$, and $Mn_3O_4$, four different situations may occur by applying the present method, based on the type of atmosphere, i.e. oxidizing or reducing, and on whether the resistivity value measured in step a) is greater or lower than a threshold resistivity value.

Thus, in the case of applying the present method in an oxidizing atmosphere environment, if the resistivity value measured in step a) is lower than a threshold resistivity value, a temperature profile is applied to the sensitive layer whose average temperature is lower than the average temperature of the other available temperature profile. And in the case of there being available more than one pair of pre-established temperature profiles, one is chosen having an average temperature lower than that of the profile applied in a previous time interval, or in the case that the latter is the minimum average temperature available, the same is applied.

In contrast, when in an oxidizing atmosphere, the resistivity value measured in step a) is greater than a threshold resistivity value, a temperature profile is applied to the sensitive layer whose average temperature is greater than the average temperature of the other available temperature profile. And in the case of there being available more than one pair of pre-established temperature profiles, one is chosen having an average temperature greater than that of the profile applied in a previous time interval, or in the case that the latter is the maximum average temperature available, the same is applied.

Additionally, in the case of a reducing atmosphere, if the resistivity value measured in step a) is greater than a threshold resistivity value, a temperature profile is applied to the sensitive layer whose average temperature is lower than the average temperature of the other available temperature profile. And in the case of there being available more than one pair of pre-established temperature profiles, one is chosen having an average temperature lower than that of the profile applied in a previous time interval, or in the case that the latter is the minimum average temperature available, the same is applied.

In contrast, when in a reducing atmosphere, the resistivity value measured in step a) is lower than a threshold resistivity value, a temperature profile is applied to the sensitive layer whose average temperature is greater than the average temperature of the other available temperature profile. And in the case of there being available more than one pair of pre-established temperature profiles, one is chosen having an average temperature greater than that of the profile applied in a previous time interval, or in the case that the latter is the maximum average temperature available, the same is applied.

According to another preferred aspect of the invention, the temperature profile is applied by way of temperature switching, describing respective functions that may assume any applicable profile.

For the sensitive layer to reach its reference temperature before step a), the sensitive layer is heated up to a predetermined reference temperature.

An additional object of the present application is a gas detection system that comprises a gas chemosensor connected to heating means associated, in turn, with a sensitive layer of the gas chemosensor; wherein the control means are connected to the sensitive layer and are configured such that they measure the resistivity of the sensitive layer, defining a control loop of sigma-delta topology.

Thanks to these characteristics a detection system is achieved that significantly reduces the response time relative to the prior art systems. This system allows to carry out a previously described method.

Preferably, the heating means may comprise a platinum resistor and the sensitive layer may comprise metal oxide nanoneedles. In addition, the sensitive layer may be caused to grow aerosol-assisted vapor phase chemical deposition and be mounted on a microplatform.

Other characteristics and advantages of the control method for gas chemosensors and of the gas detection system subjects of the present invention will become evident from the description of a preferred, non-exclusive embodiment that is illustrated by way of a non-limiting example in the attached drawings, in which:

BRIEF DESCRIPTION OF THE DRAWINGS

FIG. 6b shows a graph with the curve of the bit sequence applied in FIG. 6a;

DESCRIPTION OF A PREFERRED EMBODIMENT

In view of the aforementioned figures, and according to the adopted numbering, a preferred exemplary embodiment of the invention can be observed therein that comprises the parts and elements that are indicated and described in detail hereinafter.

The gases to be detected have not been represented in the attached figures.

Figure 1:
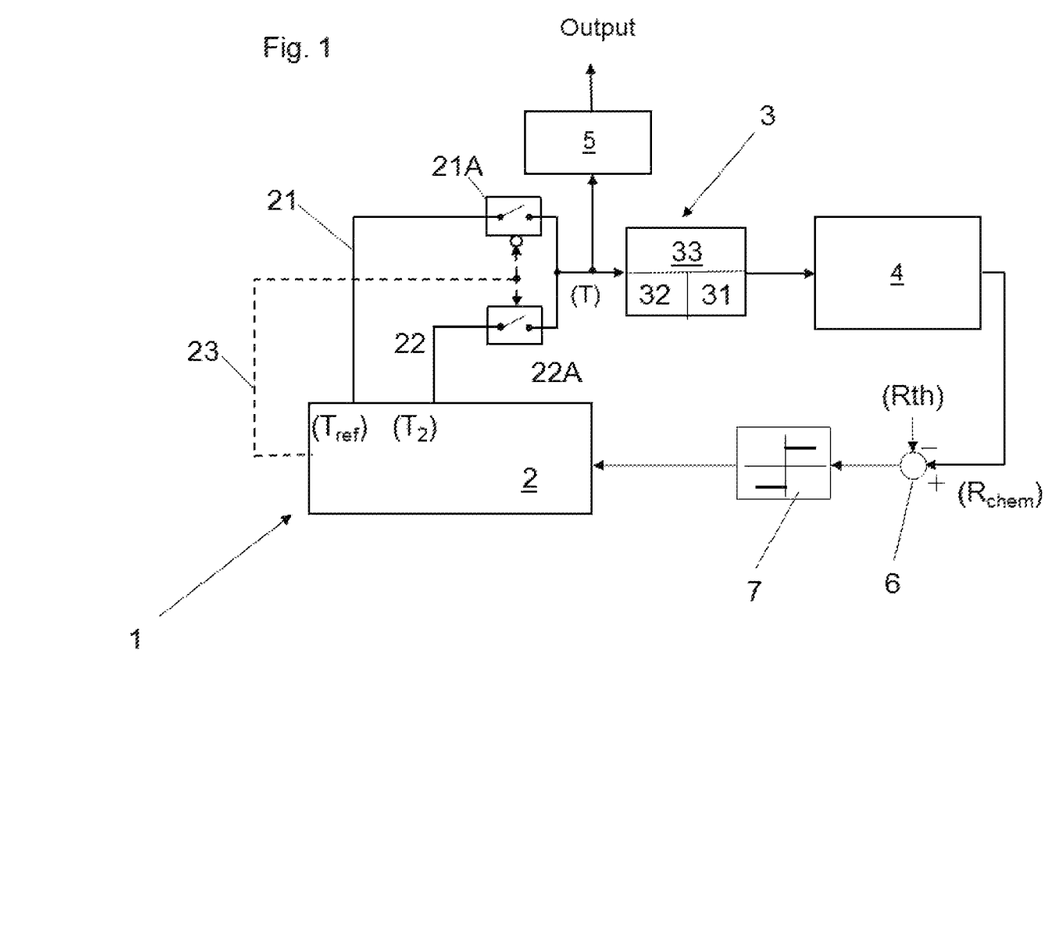
FIG. 1 is a schematic view of a gas detection system object of the present invention including functional representations.

In FIG. 1 a gas detection system 1 can be seen schematically comprising a gas chemosensor 3 connected to control means 2 associated with heating means 32 associated, in turn, with a sensitive layer 31 of the gas chemosensor 3.

The control means 2 may be any available on the market that allow, for example, to process the received information and execute a series of logic algorithms for carrying out operations such as the actuation of switches 21A, 22A, during the application of temperature profiles to the sensitive layer 31. To facilitate the actuation of the switches 21A, 22A, a channel 23 represented as a dashed line is contemplated. The switches 21A, 22A can assume any format adequate for such end, being liable to be included in the control means 2 themselves.

In the present embodiment, the sensitive layer 31 is connected to control means 2 through respective channels 21 and 22 whereby at least two types of temperature profiles are applied with different averages and obtained by switching at least between two temperatures Tref and $T_2$. Said temperature profiles can be applied to a sensitive layer 31 thanks to the presence of heating means 32, which preferably comprise a platinum resistor. The substitution of an equivalent heating element for the platinum resistor will be evident to the expert in the art.

The control means 2 are connected to the heating means 32; in addition, it can be appreciated that the control means 2 are connected to the sensitive layer 31 and are configured such that they measure the resistivity Rchem of the sensitive layer 31. To that end, measuring elements can be used that are known in the state of the art, so they will not be described in detail. The control means 2 are connected to a sensitive layer 31 and to the remaining elements detailed in the present description, defining a control loop of sigma-delta topology.

It is worth mentioning that the sensitive layer 31 comprises metal oxide nanoneedles, preferably made, but not exclusively, of tungsten oxide functionalized with gold. This sensitive layer 31 is grown by aerosol-assisted vapor phase chemical deposition, and the sensitive layer 31 is preferably mounted on a microplatform 33.

As regards the control method to be followed for gas chemosensor 3, it can be applied to the previously described system, comprising the steps of:
a) measuring the resistivity Rchem of the sensitive layer 31 at a particular moment of a time interval, the sensitive layer 31 being at a predetermined reference temperature Tref; this measurement is indicated in the information box 4;
b) based on the resistivity value Rchem measured in step a), establishing a temperature profile to be applied to the sensitive layer 31 during a time interval subsequent to that of step a);
c) obtaining an average of the temperature values across the temperature profiles applied to the sensitive layer 31 during at least one time interval subsequent to that of step a), and comparing said average temperature with stored values to determine changes in the concentration of some gas that is to be detected.

It is obvious that these stored values, for example in the control means 2, may be as many as are necessary, without any type of limitation for the expert in the field. The necessary signal will traverse the low-pass filter as an output, and, from there, it would return to the control means 2 or to another destination where it would be compared with a database of average temperature profiles related to determined gases, to determine their concentration.

Figure 2:
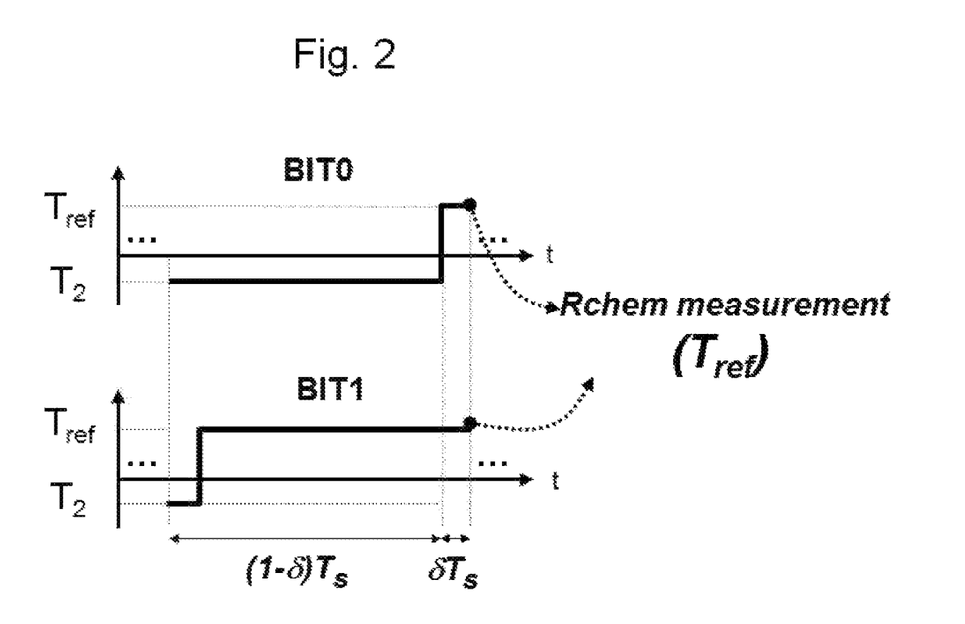
FIG. 2 shows two graphs with two exemplary temperature profiles to be applied to a sensitive layer of a system according to the present invention.

Preferably, the temperature profile established in step b) is chosen amongst at least one pair of pre-established temperature profiles BIT0, BIT1 whose average temperatures are different from each other. These temperature profiles BIT0, BIT1 represented in FIG. 2 are mere examples, since the expert would be able to apply temperature curves or slope lines, just to mention some possibilities; the temperature profiles may respond to different mathematical functions applied from the control means 2.

By way of example, for those sensors that are made of a sensitive layer made, in turn, of a type n metal oxide, as for example, ZnO, $SnO_2$, $TiO_2$, $WO_3$, $In_2O_3$, or $Fe_2O_3$, when the chemosensor 3 is located in an oxidizing atmosphere, if the resistivity value Rchem measured in step a) is lower than a threshold resistivity value Rth, a temperature profile BIT1 is applied to the sensitive layer 31 whose average temperature is greater than the average temperature of the other available temperature profile BIT0.

Continuing with the case of an oxidizing atmosphere, if the resistivity value Rchem measured in step a) is greater than a threshold resistivity value Rth, a temperature profile BIT0 is applied to the sensitive layer 31 whose average temperature is lower than the average temperature of the other available temperature profile BIT1.

In the case of a reducing atmosphere, if the resistivity value Rchem measured in step a) is greater than a threshold resistivity value Rth, a temperature profile BIT1 is applied to the sensitive layer 31 whose average temperature is greater than the average temperature of the other available temperature profile BIT0.

In the other case of a reducing atmosphere, if the resistivity value Rchem measured in step a) is lower than a threshold resistivity value Rth, a temperature profile BIT0 is applied to the sensitive layer 31 whose average temperature is lower than the average temperature of the other available temperature profile BIT1.

It can be seen that the control laws that work for the oxidizing atmosphere or environment are opposite to those that work for a reducing atmosphere or environment.

On the other hand, the control laws that work for type p semiconductors are opposite to those that work for type n semiconductors.

So, in an additional example, for those sensors that are made of a sensitive layer made, in turn, of a type p metal oxide selected amongst NiO, CuO, $Cr_2O_3$, $Co_3O_4$, and $Mn_3O_4$, when the chemosensor 3 is located in an oxidizing atmosphere, if the resistivity value Rchem measured in step a) is lower than a threshold resistivity value Rth, a temperature profile BIT0 is applied to the sensitive layer 31 whose average temperature is lower than the average temperature of the other available temperature profile BIT1.

Continuing with this example, in an oxidizing atmosphere, if the resistivity value Rchem measured in step a) is greater than a threshold resistivity value Rth, a temperature profile BIT1 is applied to the sensitive layer 31 whose average temperature is greater than the average temperature of the other available temperature profile BIT0.

On the other hand, in a reducing atmosphere, if the resistivity value Rchem measured in step a) is greater than a threshold resistivity value Rth, a temperature profile BIT0 is applied to the sensitive layer 31 whose average temperature is lower than the average temperature of the other available temperature profile BIT1.

Lastly, in a reducing atmosphere, if the resistivity value Rchem measured in step a) is lower than a threshold resistivity value Rth, a temperature profile BIT1 is applied to the sensitive layer 31 whose average temperature is greater than the average temperature of the other available temperature profile BIT0.

In FIG. 1 an information box 7 is shown representing both options that can be adopted by the comparator 6, based on the measured resistivity value Rchem. From that reading, it will be possible to select between a BIT1 or a BIT0 profile. The comparator 6 may be part of the control means 2.

As previously mentioned, in the shown examples, it was assumed that the control means 2 could only sort out two temperature profiles BIT0, BIT1; however, it is evident that there can be as many temperature profiles as necessary. So, in case of there being available more than one pair of pre-established temperature profiles, when having to apply a greater average temperature profile, one is chosen having an average temperature greater than that of the profile applied in a previous time interval, or in the case that the latter is the maximum average temperature available, the same is applied.

In turn, in the case of there being available more than one pair of pre-established temperature profiles, when having to apply a lower average temperature profile, one is chosen having an average temperature lower than that of the profile applied in a previous time interval, or in the case that the latter is the minimum average temperature available, the same is applied.

The method does not exclude that, whenever necessary, a temperature profile should be applied having a shape and average identical to the temperature profile applied in a previous interval.

As regards the temperature profiles BIT0 and BIT1 reflected in FIG. 2, they represent the function that follows the application of heat by the heating means 32. The interval is represented as a distance on the horizontal axis and the points on the vertical axis represent the temperature variation applied to the sensitive layer 31. It can be seen that independently from the applied temperature profile BIT0, BIT1, the resistivity Rchem of the sensitive layer 31 ends up being measured, at the same reference temperature Tref. Logically, said reference temperature Tref will be modifiable depending on the needs.

To apply the temperature profile, this can be done by way of temperature switching. The control means 2 can determine by means of channel 23 which of the switches 21A or 22A closes and, that way, for example, lets the electric current necessary to power the heating means 32 pass; that way, temperature pulses Tref or $T_2$ are achievable depending on the needs.

Additionally, the control method can include the fact that previous to step a) the sensitive layer 31 is heated up to a predetermined reference temperature Tref.

As for the connection of the different elements, it will be evident that in those cases in which it is possible, for example for the transmission of information, said connection may be wireless.

To verify and demonstrate the correct operation of the present invention three tests were carried out. In said three tests a gas chemosensor 3 MEMS provided with the sensitive layer 31 with tungsten oxide nanoparticles functionalized with gold and the heating means 32 in the form of a platinum resistor and a pair of gold electrodes were used.

$1^{st}$ Test: Open Loop Characterization: Fast and Slow Timescales

Figure 3:
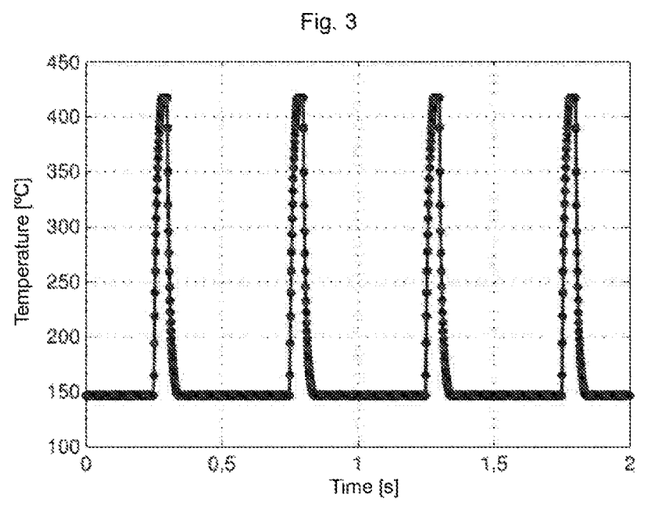
FIG. 3 shows a graph with the temperature curves applied over time.
Figure 4:
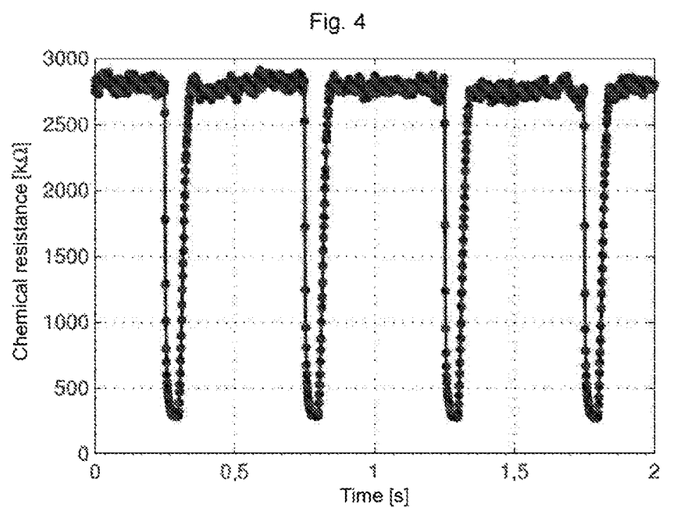
FIG. 4 shows a graph with the temporal evolution of the chemical resistivity for the test of FIG. 3.

The purpose of this section is to experimentally analyze how a change in average temperature of the sensitive layer 31 generates a change in its resistivity. Several experiments have been carried out in which the temperature value of the sensitive layer, determined by the value of the platinum resistor, is switched between two possible values (Tref and $T_2$). In a first experiment, the sensitive layer 31 is kept for 10% of the time at Tref and for 90% at $T_2$. In a second one, the percentages are interchanged. In both cases the repetition frequency of the pulses was 2 Hz. The actuation wave of the temperature profiles for the first case can be observed in FIG. 3. The corresponding resistivity values Rchem can be observed in FIG. 4. Being a semiconductive sensitive layer, if the temperature is raised (or, contrariwise, is reduced) the resistivity Rchem of the sensitive layer 31 is suddenly reduced (or, contrariwise, is raised). The dynamics of this process is relatively very fast. Therefore, a fast sweep of the temperature of the sensitive layer 31 provides a curve of Rchem (T) that shows the dependence on the temperature of the sensitive layer 31, for an almost constant surface potential of the nanostructures.

Figure 5:
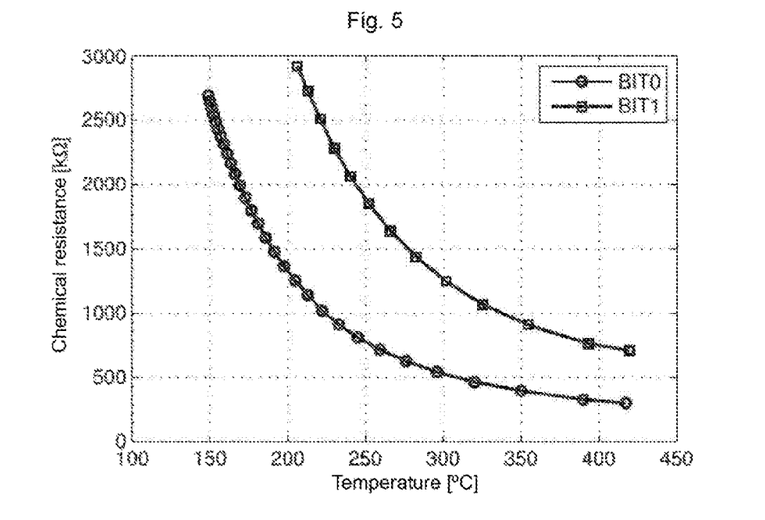
FIG. 5 shows a graph with two curves that relate the resistivity as a function of temperature, each curve associated with temperature profiles associated with two different average temperature values, each applied for two hours.

This reflects the fact that the gas detection system 1 shows a dynamic with two time scales. The increase in temperature reduces the resistivity of the semiconductive sensitive layer 31 in a process with relatively fast dynamics. On the other hand, it improves the chemosorption of the species. This means that in the long term (relatively slow time dynamics), it will shift the Rcham (T) curve vertically. In the case of an oxidizing atmosphere, Rchem (T) is shifted upwards, and downwards in the case of a reducing atmosphere. To observe this behavior, an experiment was carried out in an oxidizing atmosphere in which the long-term, immediate effects of the temperature variation in the sensitive layer 31 can be clearly observed. FIG. 5 shows two sets of points. Those that are in the lower part of the graph were plotted after applying the temperature profile shown in FIG. 3 for 2 hours: 10% of the time at high temperature (Tref), 90% of the time at low temperature ($T_2$). Those that are in the higher part of the graph were plotted after applying the complementary temperature profile (90% of the time at high temperature (Tref), 10% of the time at low temperature ($T_2$)). As can be observed, the continuous application of a temperature profile with a higher average temperature generates a vertical shift upwards of the curve Rchem (T). This increase in Rchem (T) can be associated with the temperature increase based on the number of oxygen-absorbed species in the type n semiconductive metal oxide nanoneedles.

$2^{nd}$ Test: Closed Loop Measurements

A second test was carried out with the purpose of analyzing the ability of the present control method to reach and maintain different chemical resistivity values at a constant temperature (Tref). The set of target values admissible for the chemical resistivity is given by the maximum shift generated in the curve Rchem (T) (as can be seen in FIG. 5), at the reference temperature Tref at which feedback was carried out. Once this temperature is selected, the range for the chemical threshold resistivity (Rth) can be found searching in the crossing points with the higher and lower curves of FIG. 5. Any threshold value may be reached between those points for the application of streams of control bits that correspond to different average temperature values. Outside of this range the control is saturated (a continuous sequence of either BIT0 or BIT1).

Figure 6A:
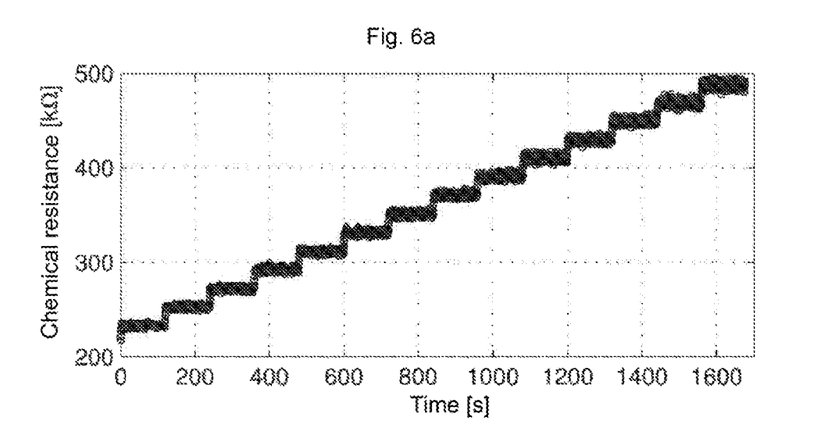
FIG. 6a shows a graph with the curve of the chemical resistivity as a function of time, in a test in which the target resistivity is modified.

FIG. 6a shows an experiment in which fourteen different targets of chemical resistivity have been changed at 2-minute intervals, measured at Tref. As can be observed, there is a small setup time, after which the chemical resistivity is maintained around the allocated threshold value Rth.

Figure 6B:
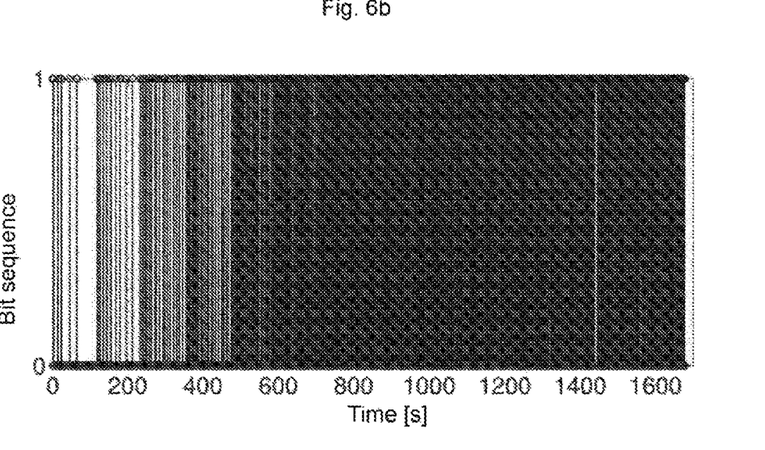
Figure 6C:
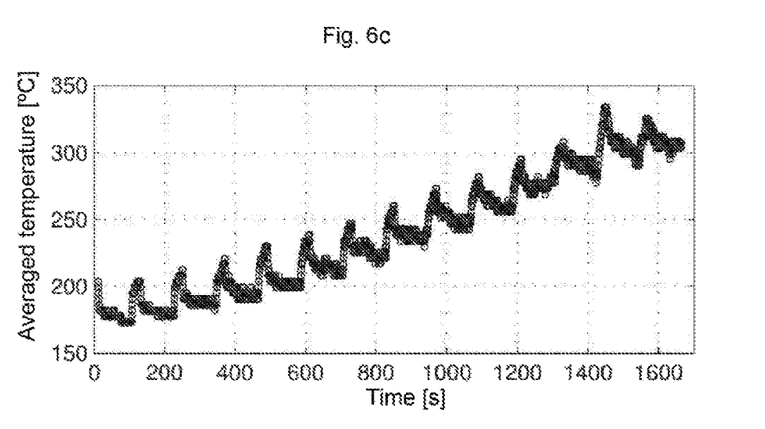
FIG. 6c shows a graph with the average temperature profile applied in FIGS. 6a and 6b.

FIG. 6b shows how the bit stream changes while the values of the target chemical resistance values change. Finally, FIG. 6c shows the bit stream shown in FIG. 6b being low-pass filtered. Each time that the threshold is changed there is a peak until the system reaches the next target level of chemical resistivity. After this transient, the bit stream settles on a number around its steady state value.

Figure 7:
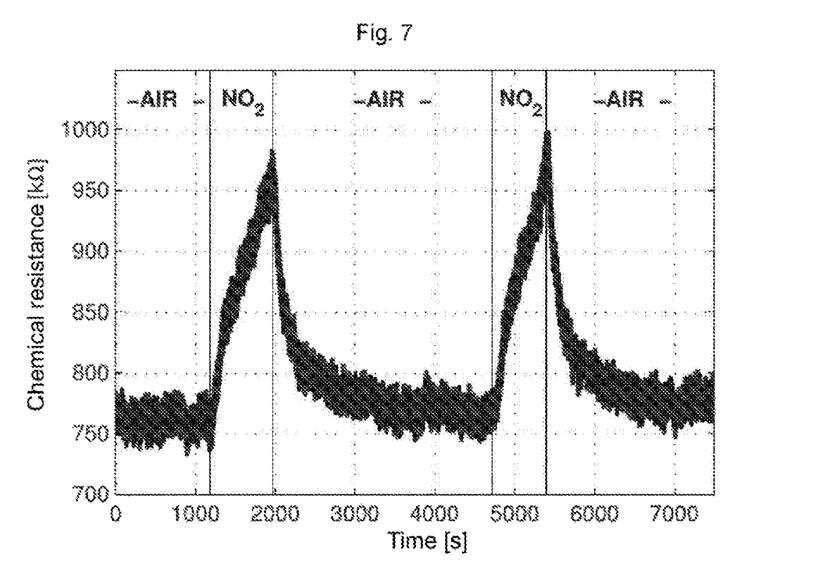
FIG. 7 shows a graph of the chemical resistivity over time, at a constant reference temperature, for an experiment in which an air atmosphere gives room to an atmosphere with 25 ppb of $NO_2$.

$3^{rd}$ Test: Acceleration of the Transient Response of the Measurement to Detect Changes in Gas Concentration A first test was carried out with the sensitive layer 31 working at a constant temperature, Tref, without control, wherein the sensitive layer 31 was exposed to synthetic air and to 25 ppb of $NO_2$. As can be observed in FIG. 7, the response of sensor 3 and the recovery are relatively very large.

Figure 8:
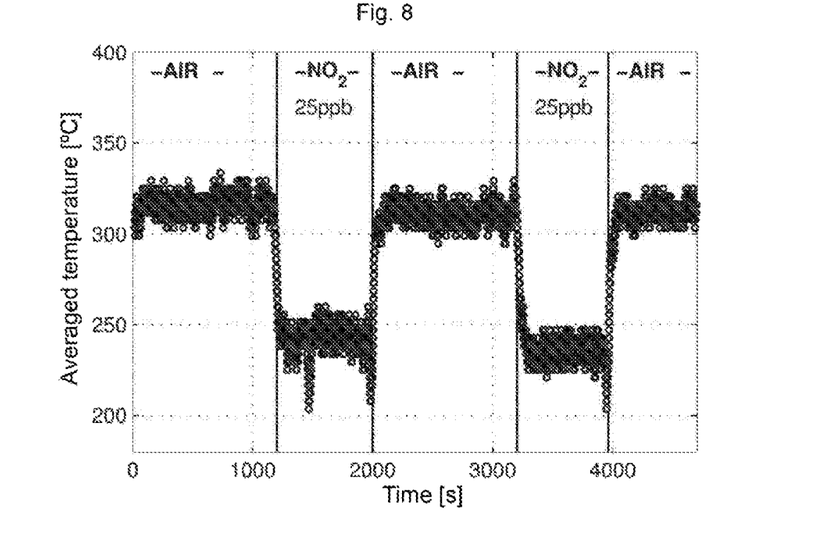
FIG. 8 shows a graph with the average temperature applied to the sensitive layer in an environment wherein air gives room to $NO_2$.
Figure 9:
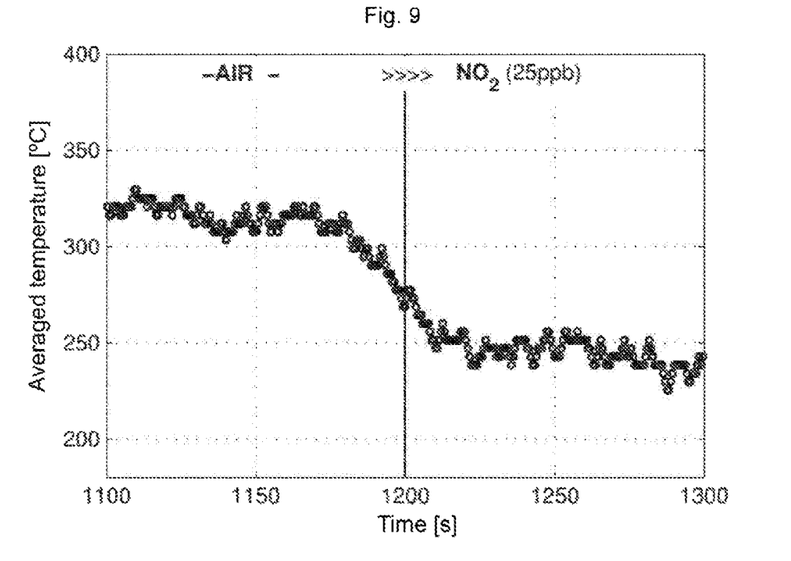
FIG. 9 shows an enlargement of the transition from air to $NO_2$ of the graph of FIG. 8.

In the next test, a target chemical resistivity of 450 kΩ was set as a threshold value of the chemical control loop. During the first part of the test, sensor 3 was in contact with synthetic air for 20 minutes; then, in contact with 25 ppb of $NO_2$ for 13 minutes. The whole cycle was repeated twice. FIG. 8 shows the average bit stream as time function of the chemical control loop. As can be observed, in order to keep the resistivity of the sensitive layer 31 constant, it is necessary to reduce the average temperature. The transient response is relatively fast and FIG. 9 shows an enlarged view of a change from synthetic air to $NO_2$. The frame was obtained after a convolution of 50 samples, and the response time is less than 50 s. It should be taken into account that the recovery time is very similar to the response time, which indicates a clear improvement of the dynamics of the sensors 3 according to the method of the present invention.

This test shows that with the purpose of maintaining the sensor in the condition established by the closed loop, it is necessary to change the average temperature of the sensitive layer 31. It is possible to draw information from this signal about the changes in concentration of the target gases.

Conclusions from the Three Tests

The first tests of the results of the application of a closed control loop to a gas chemosensor 3 have been shown with a sensitive layer 31 made of $WO_3$ nanoneedles functionalized with gold nanoparticles. The proposed control loop has been shown to be capable of maintaining the resistivity Rchem of the sensitive layer 31 constant measured at a constant reference temperature Tref. The changes in concentration of the target gases are compensated for by the changes in average temperature applied to the sensitive layer 31. This results in a clear improvement in the response time of the sensor 3 according to the method and the system of the present invention.

The details, shapes, dimensions and other accessory elements, as well as the materials used in the manufacturing of the control method of gas chemosensors and of the gas detection system of the invention can be conveniently substituted by others that do not depart from the scope defined by the claims that follow.

REFERENCES

[1] Junhua Ding, Thomas J. McAvoy, Richard E. Cavicchi, Steve Semancik, "Surface state trapping models for $SnO_2$-based microhotplate sensors", Sensors and Actuators B: Chemical, Volume 77, $3^{rd}$ edition, pages 597-613, 2001.

[2] J. Fonollosa, S. Sheik, R. Huerta, and S. Marco, "Reservoir computing compensates slow response of chemosensor arrays exposed to fast varying gas concentrations in continuous monitoring," Sensors Actuators B Chem., vol. 215, pp. 618-629, August 2015.

[3] J. Samitier, J. M. López-Villegas, S. Marco, L. Cámara, A. Pardo, O. Ruiz, and J. R. Morante, "A new method to analyse signal transients in chemical sensors," Sensors Actuators B Chem., vol. 18, no. 1-3, pp. 308-312, March 1994.

[4] C. Di Natale, S. Marco, F. Davide, and A. D'Amico, "Sensor-array calibration time reduction by dynamic modelling," Sensors Actuators B Chem., vol. 25, no. 1-3, pp. 578-583, April 1995.

[5] E. Llobet, J. Brezmes, X. Vilanova, J. E. Sueiras, and X. Correig, "Qualitative and quantitative analysis of volatile organic compounds using transient and steady-state responses of a thick-film tin oxide gas sensor array," Sensors Actuators B Chem., vol. 41, no. 1-3, pp. 13-21, June 1997.

[6] R. Gutierrez-Osuna, "Pattern analysis for machine olfaction: a review," IEEE Sens. J., vol. 2, no. 3, pp. 189-202, June 2002.

[7] M. K. Muezzinoglu, A. Vergara, R. Huerta, N. Rulkov, M. I. Rabinovich, A. Selverston, and H. D. I. Abarbanel, "Acceleration of chemo-sensory information processing using transient features☆," Sensors Actuators B Chem., vol. 137, no. 2, pp. 507-512, April 2009.

[8] J. G. Monroy, J. González-Jiménez, and J. L. Blanco, "Overcoming the slow recovery of MOX gas sensors through a system modeling approach.," Sensors (Basel)., vol. 12, no. 10, pp. 13664-80, January 2012.

[9] R. Gutierrez-Osuna, H. T. Nagle, and S. S. Schiffman, "Transient response analysis of an electronic nose using multi-exponential models," Sensors Actuators B Chem., vol. 61, no. 1-3, pp. 170-182, December 1999.

[10] R. Ionescu, E. Llobet, S. Al-Khalifa, J. W. Gardner, X. Vilanova, J. Brezmes, and X. Correig, "Response model for thermally modulated tin oxide-based microhotplate gas sensors," Sensors Actuators B Chem., vol. 95, no. 1-3, pp. 203-211, October 2003.

[11] S. Marco, A. Pardo, F. A. M. Davide, C. Di Natale, A. D'Amico, A. Hierlemann, J. Mitrovics, M. Schweizer, U. Weimar, and W. Göpel, "Different strategies for the identification of gas sensing systems," Sensors Actuators B Chem., vol. 34, no. 1-3, pp. 213-223, August 1996.

[12] A. Pardo, S. Marco, and J. Samitier, "Nonlinear inverse dynamic models of gas sensing systems based on chemical sensor arrays for quantitative measurements," Instrum. Meas. IEEE Trans., vol. 47, no. 3, pp. 644-651, 1998.

[13] S. De Vito, E. Massera, M. Piga, L. Martinotto, and G. Di Francia, "On field calibration of an electronic nose for benzene estimation in an urban pollution monitoring scenario," Sensors Actuators, B Chem., vol. 129, no. 2, pp. 750-757, 2008.

[14] S. De Vito, A. Castaldo, F. Loffredo, E. Massera, T. Polichetti, I. Nasti, P. Vacca, L. Quercia, and G. Di Francia, "Gas concentration estimation in ternary mixtures with room temperature operating sensor array using tapped delay architectures," Sensors Actuators, B Chem., vol. 124, no. 2, pp. 309-316, 2007.

[15] E. Di Lello, M. Trincavelli, H. Bruyninckx, and T. De Laet, "Augmented switching linear dynamical system model for gas concentration estimation with MOX sensors in an open sampling system," Sensors (Basel)., vol. 14, no. 7, pp. 12533-59, January 2014.

What is claimed is:

1. A control method for gas chemosensors (3), wherein the chemosensors (3) include at least one sensitive layer (31) made of a semiconductive metal oxide, said method comprising the steps of:
   a) measuring a resistivity value (Rchem) of said sensitive layer (31) at a particular moment of a time interval, the sensitive layer (31) being at a predetermined reference temperature (Tref);
   b) based on the resistivity value (Rchem) measured in step a), establishing a temperature profile to be applied to the sensitive layer (31) during a time interval subsequent to that of step a)
   wherein steps a) and b) are carried out periodically, wherein the temperature profiles are established to keep the resistivity values (Rchem) measured in steps a) constant, and wherein the method further comprises:

c) obtaining an average of the temperature values across the established temperature profiles applied to the sensitive layer (31) during at least a time interval subsequent to that of step a) and comparing said average temperature with stored values to determine changes in the concentration of a gas that is to be detected.

2. A control method for gas chemosensors (3) according to claim 1, wherein the temperature profile established in step b) is chosen amongst at least one pair of pre-established temperature profiles (BIT0, BIT1), whose average temperatures are different from each other.

3. A control method for gas chemosensors (3) according to claim 1, wherein the semiconductive metal oxide is selected from the group consisting of type p semiconductors and type n semiconductors.

4. A control method for gas chemosensors (3) according to claim 3, wherein the sensitive layer is made of a type n semiconductive metal oxide.

5. A control method for gas chemosensors (3) according to claim 4, wherein, in an oxidizing atmosphere, if the resistivity value (Rchem) measured in step a) is lower than a threshold resistivity value (Rth), a second temperature profile (BIT1) is applied to the sensitive layer (31), said second temperature profile (BIT1) having an average temperature greater than an average temperature of a first temperature profile (BIT0).

6. A control method for gas chemosensors (3) according to claim 5, wherein, in case more than one pair of pre-established second temperature profiles is available, one is chosen having an average temperature profile greater than that of the profile applied in a previous time interval, or, in the case that the latter is the maximum temperature profile available, the same is applied.

7. A control method for gas chemosensors (3) according to claim 4, wherein, in an oxidizing atmosphere, if the resistivity value (Rchem) measured in step a) is greater than a threshold resistivity value (Rth), a first temperature profile (BIT0) is applied to the sensitive layer (31), said first temperature profile (BIT0) having an average temperature lower than an average temperature of a second temperature profile (BIT1).

8. A control method for gas chemosensors (3) according to claim 7, wherein, in case more than one pair of pre-established first temperature profiles is available, one is chosen having an average temperature profile lower than that of the profile applied in a previous time interval, or, in the case that the latter is the minimum average temperature available, the same is applied.

9. A control method for gas chemosensors (3) according to claim 4, wherein, in a reducing atmosphere, if the resistivity value (Rchem) measured in step a) is greater than a threshold resistivity value (Rth), a second temperature profile (BIT1) is applied to the sensitive layer (31), said second temperature profile (BIT1) having an average temperature greater than an average temperature of a first temperature profile (BIT0).

10. A control method for gas chemosensors (3) according to claim 4, wherein, in a reducing atmosphere, if the resistivity value (Rchem) measured in step a) is lower than a threshold resistivity value (Rth), a first temperature profile (BIT0) is applied to the sensitive layer (31), said first temperature profile (BIT0) having average temperature lower than an average temperature of a second temperature profile (BIT1).

11. A control method for gas chemosensors (3) according to claim 3, wherein the sensitive layer is made of a type p semiconductive metal oxide.

12. A control method for gas chemosensors (3) according to claim 11, wherein, in an oxidizing atmosphere, if the resistivity value (Rchem) measured in step a) is lower than a threshold resistivity value (Rth), a first temperature profile (BIT0) is applied to the sensitive layer (31), said first temperature profile (BIT0) having an average temperature lower than an average temperature of a second temperature profile (BIT1).

13. A control method for gas chemosensors (3) according to claim 11, wherein, in an oxidizing atmosphere, if the resistivity value (Rchem) measured in step a) is greater than a threshold resistivity value (Rth), a second temperature profile (BIT1) is applied to the sensitive layer (31), said second temperature profile (BIT1) having an average temperature greater than an average temperature of a first temperature profile (BIT0).

14. A control method for gas chemosensors (3) according to claim 11, wherein, in a reducing atmosphere, if the resistivity value (Rchem) measured in step a) is greater than a threshold resistivity value (Rth), a first temperature profile (BIT0) is applied to the sensitive layer (31), said first temperature profile (BIT0) having an average temperature lower than an average temperature of a second temperature profile (BIT1).

15. A control method for gas chemosensors (3) according to claim 11, wherein, in a reducing atmosphere, if the resistivity value (Rchem) measured in step a) is lower than a threshold resistivity value (Rth), a second temperature profile (BIT1) is applied to the sensitive layer (31), said second temperature profile (BIT1) having an average temperature greater than an average temperature of a first temperature profile (BIT0).

16. A control method for gas chemosensors (3) according to claim 1, wherein, previous to step a), the sensitive layer (31) is heated up to a predetermined reference temperature (Tref).

* * * * *